Patented Jan. 29, 1946

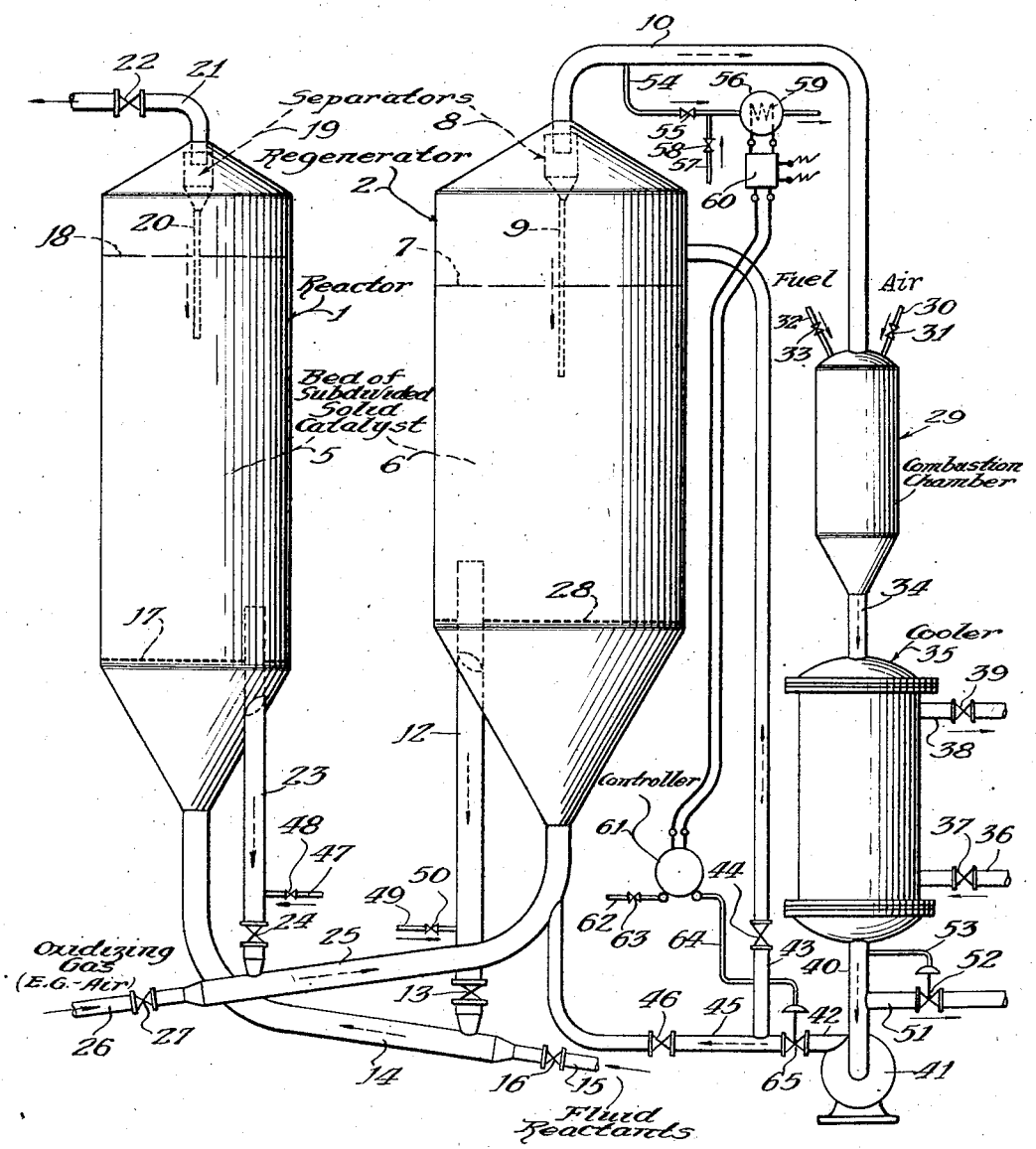

2,393,839

UNITED STATES PATENT OFFICE 2,393,839

REGENERATION OF SUBDIVIDED SOLIDS

Charles L. Thomas and John T. Pinkston, Jr., Riverside, Ill., assignors to Universal Oil Products Company, Chicago, Ill., a corporation of Delaware Application December 27, 1943, Serial No. 515,866

13 Claims. (Cl. 252—242)

The invention relates to an improved method for the removal of combustible contaminants from substantially non-combustible subdivided solids by burning of the contaminants.

The invention is more specifically directed to improvements in that type of operation wherein the mass of solid particles from which combustible contaminants are being burned is maintained in the form of a fluid-like bed of relatively high density or solid particle concentration. In operations of this general type it is advantageous to maintain a light-phase region of materially reduced solid particle concentration above the fluid-like bed in the confined zone or vessel in which burning is accomplished. By so doing, a major separation of solid particles from the gaseous products of combustion leaving the fluid-like bed is effected within the latter at substantially its upper extremity and within the lower portion of the light phase above the bed, so that only a small amount of entrained solid particles remain to be separated from the outgoing gas stream, thus reducing the load on the solid particle separating equipment employed.

One of the major difficulties encountered in operations of the type above outlined is the occurrence of a phenomenon known as "after-burning" in the light phase existing above the fluid-like bed of solid particles undergoing regeneration. When after-burning occurs, a visible flame exists in the light phase and is accompanied by pronounced glowing of the solid particles in the region of the flame indicating that they are heated to an exceptionally high temperature.

There is an upper limit of temperature to which subdivided solid catalyst or contact material employed in commercial operations of the type above mentioned can be safely heated without destroying or permanently impairing its activity. For example, the best catalyst employed for the catalytic cracking and reforming of hydrocarbons rapidly loses activity for promoting the hydrocarbon conversion reaction at a temperature above about 1200–1300° F. The rapid destruction of their desirable properties at high temperature is characteristic of many other subdivided solid catalysts and solid contact materials in general, and in many instances, the safe maximum temperature for their regeneration is considerably less than that above mentioned. In cracking or reforming operations employing subdivided solid catalysts such as silica composited with one or more metal oxides such as alumina, zirconia, magnesia and the like, provision is usually made for limiting the temperature in the fluid-like bed undergoing regeneration to approximately 1050–1100° F.

One of the important reasons for employing a relatively dense fluid-like bed in the regenerating step is to obtain substantially uniform heat distribution throughout the bed. This temperature distribution is the result of rapid circulation of solid particles or turbulence throughout the bed, brought about by hindered settling of the catalyst particles. It is not obtained in the light phase region above the bed where the solid particle concentration is too low to bring about a rapid diffusion of heat. Thus, the existence of a flame in the light phase creates a zone of localized excessively high temperature which damages entrained catalyst particles in the region of the flame. The rapid decline of catalyst activity which has sometimes been experienced in the cracking and reforming operations of the fluid bed type, is therefore attributed to the occurrence of after-burning in the light phase region of the regenerator. Even though the concentration of catalyst particles in the light phase is relatively low, a major portion of the entire catalyst inventory within the system will have been present in the light phase at some time during a relatively short period of operation. Since the process is operating continuously over a prolonged period, with only a small amount of catalyst replenishment to compensate for the loss of catalyst fines and keep the catalyst inventory substantially constant, even infrequent after-burning will cause a pronounced decline in the average activity of the entire catalyst inventory.

The primary purpose of the present invention is to prevent the occurrence of after-burning and resulting rapid decline in catalyst activity and possible damage to plant equipment in operations such as above mentioned.

After-burning results from the existence of a flammable gas mixture in the light phase. The gases leaving the fluid-like bed of subdivided solid particles undergoing regeneration will normally contain the combustion products carbon dioxide, carbon monoxide and steam, as well as free oxygen supplied to the fluid bed as a component of the oxidizing gas employed for regeneration and not entirely consumed by burning within the bed. They often also contain volatile hydrocarbons evolved from the bed without being burned therein and, in addition, nitrogen or other diluent of the oxidizing gas stream employed for regeneration passes through the bed into the light phase.

We have found that after-burning can be prevented by controlling the concentration of either free oxygen or combustibles in the gas mixture existing in the light phase so that this mixture is non-flammable under the conditions of temperature, pressure and solid particle concentration prevailing in the light phase. In studying the phenomenon of after-burning, we have found that under the conditions commonly encountered in commercial operations, the gas mixture existing in the light phase is non-flammable when its combustible content does not exceed approximately 6 mol per cent of the mixture or when its free oxygen content does not exceed approximately 1½ mol per cent. In accordance with the provisions of the invention, we insure that the oxygen or combustible content of the gas mixture in the light phase is kept at the required low value by diluting it with gas which is either substantially devoid of combustible components or is substantially devoid of free oxygen, or both. This may be accomplished by supplying the diluent gas directly into the light phase in the regenerator without passing it through the fluid bed therein or, when desired, at least a portion of the diluent gas may be supplied to the fluid bed with the air or other oxidizing gas employed for effecting combustion within the bed to pass with resulting gaseous products of combustion from the bed into the light phase.

In accordance with the preferred mode of operation provided by the invention, the gas mixture being discharged from the light phase of the regenerator is supplied to a separate confined combustion chamber after substantially all of the entrained solid particles have been separated from the gas stream. All or a substantial portion of the combustible components of this gas mixture are burned in said combustion chamber to provide a gas stream substantially devoid of combustibles or substantially all free oxygen in the gas mixture is consumed in the combustion chamber to form a gas stream substantially devoid of free oxygen. Resulting gases, substantially devoid of free oxygen or combustible, are returned to a light phase in a quantity regulated to keep the gas mixture in the light phase non-flammable therein. When desired, the total gas stream leaving said combustion chamber or that portion of it which is returned to the light phase as diluent gas may be cooled by passing it through a suitable heat exchanger, waste heat boiler, steam superheater or the like, in which readily available heat is recovered for some useful purpose. Such cooling of the diluent gas employed, to a temperature below that which would normally prevail in the light phase, will serve to increase the permissible combustible content or oxygen content of the gas mixture in the lgiht phase so that less diluent gas recirculation is required to obtain the desired objective.

The invention also provides a method for automatically regulating the rate at which diluent gas is supplied to the light phase in response and in direct relation to the combustible content or the free oxygen content of the gas mixture existing in the light phase.

The features of the invention will be found advantageous as applied to regeneration by burning, following all reactions conducted in the presence of subdivided solid contact material or catalyst which requires regeneration by burning of combustible contaminants therefrom and which is susceptible to damage at excessively high temperature. Reactions such as the catalytic cracking of hydrocarbons employing a siliceous catalyst such as for example, solid particles comprising a composite of silica with one or more metal oxides such as alumina, zirconia or magnesia, exemplify operations to which the features of the regeneration are particularly applicable. The following further description of the invention will therefore be directed particularly to its features as applied to regeneration by burning, following catalytic cracking.

The term "cracking" is here used in a broad sense to include operations now generally termed "reforming" or "retreating," wherein light hydrocarbon distillates such as gasoline or gasoline fractions, naphtha and the like are treated in the presence of cracking catalyst to improve their octane rating, susceptibility to the influence of lead-tetra-ethyl for increasing their octane rating, and the like, as well as operations in which oils boiling above the range of gasoline are converted to produce substantial yields of the latter, or in which normally liquid or normally gaseous hydrocarbons are cracked to produce more valuable lighter fractions.

The invention is explained in more detail in conjunction with the following description of the accompanying diagrammatic drawing. The drawing is an elevational view of one specific form of apparatus provided by the invention and in which the improved mode of operation provided may be successfully conducted.

Referring now to the drawing, a vertically elongated reaction vessel of substantially cylindrical form is indicated at 1 and is operated in conjunction with a similar regenerating vessel 2. The reactor 1 is employed as a zone in which hydrocarbons or other fluid reactants to be converted are contacted with a bed of subdivided solid particles, such as catalyst or contact material, in the presence of which the reactants are converted and upon which deleterious combustible deposits are formed as a result of the conversion reaction. The regenerator 2 is employed as a zone to which contaminated catalyst or contact material is supplied from the reactor and therein contacted with oxidizing gas to burn combustible deposits from the solid particles and thus effect their regeneration.

A relatively dense bed 5 of the subdivided solid particles is maintained in reactor 1 and another relatively dense bed 6 of the solid particles undergoing regeneration is maintained within regenerator 2. In the type of operation to which the invention is particularly directed, the bed of solid particles in the regenerating zone is maintained in a fluid-like condition, while still retaining a relatively high solid particle concentration in the bed, by passing the oxidizing gas employed for regeneration and resulting combustion gases upwardly through the bed at a velocity regulated to partially counteract the force of gravity on the solid particles and bring about their hindered settling within the bed. Preferably, the bed in the regenerator is sufficiently agitated and turbulent to obtain a substantially uniform temperature throughout the bed so as to avoid the development of hot spots or zones of localized excessively high temperature therein.

The approximate upper extremity of the relatively dense fluid-like bed in regenerator 2 is indicated by the broken line 7 in the drawing and a region known as the "light phase," in which the solid particle concentration is materially reduced relative to that prevailing in the fluid bed 6, is maintained in the upper portion of the regenerator between the upper extremity 7 of the bed and the point at which the gaseous products of regeneration and solid particles of the catalyst or contact material entrained in the outgoing gas stream are supplied to the separating equipment indicated at 8. Separator 8 may be, for example, of the centrifugal or cyclone type and is provided for the purpose of removing at least a substantial portion of the entrained solid particles from the outgoing gas stream. The separated solid particles are returned from the lower portion of separator 8 through standpipe 9 to the fluid bed 6 and gases from which the solid particles have been separated are directed from the upper portion of separator 8 through line 10 preferably to the subsequent equipment which will be later described.

A relatively dense stream or column of solid particles is directed from a suitable point within the fluid bed 6 of the regenerator downwardly through standpipe 12 and through the adjustable orifice or flow control valve 13 adjacent the lower end of standpipe 12 into transfer line 14, wherein the stream of hot regenerated solid particles meets and commingles with the incoming stream of fluid reactants supplied through line 15 and valve 16. A suitable differential pressure is maintained across the orifice or valve 13 to prevent the upward passage of fluid reactants from line 15 through standpipe 12 and the gas-lift action of the fluid reactants effects transportation of the solid particles from column 12 through line 14 into the lower portion of reactor 1. In case the reactants are supplied to line 14 in liquid state, they will be substantially vaporized by contact therein with the hot regenerated solid particles supplied from the regenerator through column 12 and the resulting mixture of essentially vaporous reactants and suspended solid particles is directed upwardly through the substantially conical lower head of the reactor and substantially uniformly distributed over the horizontal cross-section of its cylindrical portion in passing through a suitable perforate plate or distributing grid 17 provided, in the case illustrated, at substantially the junction of the cylindrical shell with the cone bottom of the reaction.

In the specific operation here illustrated, the bed 5 of subdivided solid particles within reactor 1 is also maintained in a fluid-like condition by the passage of fluid reactants and fluid conversion products upwardly through the bed at a velocity which partially counteracts the force of gravity on the solid particles and brings about their hindered settling. Also, in the case illustrated, a light phase region of materially reduced solid particle concentration is maintained in the upper portion of the reactor above the upper extremity 18 of the fluid bed. The mixture of fluid conversion products and suspended solid particles is directed from the light phase in the reactor to suitable solid particle separating equipment, such as the centrifugal or cyclone separator indicated at 19, wherein at least a substantial portion of the entrained solid particles are separated from the outgoing stream of fluid conversion products. The separated solid particles are returned from the lower portion of separator 19 through standpipe 20 to the fluid bed 5. Fluid conversion products are directed from the upper portion of the separator through line 21 and pressure control valve 22, preferably to further separating, fractionating and collecting equipment of any suitable conventional form, not illustrated.

A relatively dense stream or column of solid particles is directed from any suitable point in the bed 5 of the regenerator beneath its upper extremity 18 downwardly through standpipe 23 and the adjustable orifice or flow control valve 24 disposed adjacent the lower end of the standpipe into transfer line 25. In line 25, solid particles from standpipe 23 meet and commingle with a stream of oxidizing gas supplied to line 25 through line 26 and valve 27. A sufficient pressure drop is maintained across valve 24 to prevent the upward passage of oxidizing gas from line 26 through standpipe 23 and the gas-lift action of the oxidizing gas transports the solid particles from standpipe 23 through transfer 25 into the lower portion of regenerator 2. The mixture of oxidizing gas employed for regeneration and the suspended solid particles passes upwardly through the conical lower head of the regenerator and is distributed substantially uniformly over the horizontal cross-section of the cylindrical portion of the regenerator by means of a suitable perforate plate or distributing grid 28 provided, in the case illustrated, at substantially the junction of the cylindrical shell with the cone bottom of the regenerator.

In passing upwardly through the fluid-like bed 6 in the regenerator, free oxygen in the regenerating gas stream supplied through line 26 is substantially consumed to bring about rapid oxidation or burning of combustibles from the solid particles within the bed and regenerate the same. The heat thus generated is distributed substantially uniformly throughout the fluid bed 6 by virtue of its turbulent fluid-like condition and the relatively high concentration of solid particles within the bed.

When the quantity of combustibles accumulated by the solid particles in the reactor and supplied therewith to the regenerator is so high, in relation to the average residence time for the solid particles in the regenerator, that the rate at which they are burned to obtain the desired degree of regeneration would cause the developement of an excessively high temperature in the fluid bed 6 and thus cause damage or permanent impairment to the catalyst or contact material, we contemplate preventing the development of an excessive temperature in the fluid-like bed in the regenerator by recirculating cooled regenerated catalyst therethrough. This is now a common expedient in operations of the fluid bed type and obviates the use of a heat exchange type regenerator containing a large and well distributed area of heat exchange surface in the form of closely spaced tubes or the like. This control of the average temperature in the fluid bed of the regenerator may be accomplished, for example, by withdrawing a stream of catalyst from the upper portion of the fluid bed and returning the same through a suitable side-arm cooler or heat exchanger to the lower portion of the regenerator for recirculation through the bed. To avoid unnecessary complexity this feature is not illustrated in the drawing, since it is not essential in all operations contemplated by the invention and is not a novel part of the invention per se.

To materially reduce or prevent the passage of reactants and light combustible conversion products, such as occluded hydrocarbon vapors or gases, to the regenerator in the stream of solid particles supplied thereto from the reactor, suitable stripping gas, such as steam, for example, is supplied to standpipe 23 on the upstream side of valve 24 through line 47 and valve 48. Similarly, suitable stripping gas, such as steam, for example, may be supplied through line 49 and valve 50 to standpipe 12 on the upstream side of valve 13 to substantially free the column of solid particles passing through the latter of occluded oxidizing gas and combustion gases and prevent their passage from the regenerator to the reactor. The stripping gas also serves to keep the columns of solid particles passing through standpipes 12 and 23 sufficiently aerated to prevent a degree of compaction which would hinder or stop the flow of solid particles in these standpipes.

The gas mixture discharged through line 10 is directed to combustion chamber 29 which may be operated either to burn substantially all of the combustible components from the gas stream, or to substantially completely remove free oxygen therefrom by employing it to support combustion, or both. When it is desired to substantially completely remove combustibles from the gas stream supplied to chamber 29, air or other oxidizing gas may, when required, be supplied thereto through line 30 and valve 31 in a sufficient quantity to insure substantially completely oxidization of all of the combustibles. In case chamber 29 is operated for the substantially complete removal of free oxygen from the gas stream supplied thereto, sufficient fuel may, when required, be added through line 32 and valve 33 to insure substantially complete consumption of the oxygen in supporting its combustion. Although not ordinarily required, a contact mass of suitable combustion promoting catalyst, not illustrated, may be provided in chamber 29 to insure initiation and substantial completion of the combustion reaction in this zone.

The temperature of the gas stream leaving the regenerator through line 10 will normally be relatively high, say of the order of 1000 to 1100° F. or thereabouts, and its temperature and heat content will be increased by the burning which takes place in combustion chamber 29. A substantial portion of this heat content may be readily recovered from the gases for generating and/or superheating steam, or for preheating the fluid reactants supplied to the system through line 15 or the oxidizing gas supplied through line 26, or for some other useful purpose. As previously explained it is also advantageous to cool the diluent gas supply to the light phase of the regenerator so as to reduce the quantity of this gas required to accomplish the desired result. Therefore in the preferred embodiment of the invention the hot gas stream leaving combustion chamber 29 is directed through line 34 to cooler 35 which may comprise any suitable form of heat change equipment to which air, water, steam, fluid reactants to be converted or other suitable cooling fluid is supplied through line 36 and valve 37, passed through the cooler in indirect contact and heat exchange relation with the gases from chamber 29 and discharged at increased temperature through line 38 and valve 39.

The resulting gases which are either substantially devoid of free oxygen or substantially devoid of combustible components, or both, are directed from cooler 35 through line 40 and are supplied in part to a blower or compressor 41 of any suitable conventional form by means of which they are returned in regulated quantities to the regenerator. Gases are discharged from the blower or compressor 41 through line 42 and are directed either through the branch line 43 and valve 44 directly into the light phase above the fluid bed 6 in the regenerator or through branch line 45 and valve 46 into the lower portion of the regenerator to pass through the fluid bed into the light phase. Alternatively a portion of the diluent gas may, when desired, be supplied through line 43 and valve 44 directly to the light phase while another portion thereof is supplied through line 45 and valve 46 and through the fluid bed 6 into the light phase of the regenerator. The quantity of gas not required for circulation as diluent to the regenerator is discharged from the system through line 51 and valve 52 which, in this particular instance, communicate with line 40. In the case illustrated valve 52 is an automatic pressure control valve of the diaphragm type which maintains a substantially constant pressure in the regenerator and in combustion chamber 29 and cooler 35 by opening in response to any increase in the pressure prevailing in line 40, with which the diaphragm of the valve is connected through line 53, and closing in response to a decrease in the pressure in line 40.

It is, of course, entirely within the scope of the invention to return diluent gas substantially devoid of free oxygen or substantially devoid of combustibles from combustion chamber 29 to the light phase of the regenerator without passing them through cooler 35. In such instances, however, a similar cooler is preferably provided in line 51 for recovery of available heat from the net quantity of gases discharged from the system through this line. It is, of course, also possible and within the scope of the invention to cool the diluent gas being recycled to the regenerator and to further cool and recover additional heat from the gas stream being discharged through line 51.

It is also within the scope of the invention, when desired, to connect the gas discharge line 51 with line 10 rather than with line 40, so that the net make or unrecycled portion of the gases is not passed through chamber 29. This arrangement will somewhat reduce the required size of combustion chamber 29 and is satisfactory when the process is operated so as to keep the combustible content of the gas mixture in the light phase below the flammable limit for the mixture. In such instances the additional heat which would be made available by burning of the small quantity of combustibles in the outgoing gas stream is proportionately small in comparison with that obtainable when the process is operated with a high content of combustibles and a low content of free oxygen in the gas mixture existing in the light phase. However, in case the net make of hot combustion gases being discharged from the system is not passed through combustion chamber 29 and cooler 35 it is desirable to provide suitable equipment, not illustrated, such as a waste heat boiler, heat exchanger or the like for recovering available heat therefrom since this available heat will be substantial due to the normally high temperature and large volume of such gases discharged from the system.

As previously indicated, the diluent gas supplied to the light phase of the regenerator may be substantially devoid of free oxygen, in which case it serves to keep the free oxygen content of the gas mixture existing in the light phase below the flammable limit, which is normally about 1½ mol per cent. Alternatively the diluent gas may be substantially devoid of combustibles, in which case it serves to keep the combustible content of the mixture with which it is commingled in the light phase below the flammable limit, which is normally about 6 mol per cent. In some instances, and particularly in case a combustion promoting catalyst is employed in zone 29 so that it is not necessary to supply either an excess of oxygen or an excess of fuel to this zone through the respective lines 30 and 32, the diluent gas may be substantially devoid of both free oxygen and combustible components. This will give double assurance that the gas mixture in light phase is not flammable when the diluent gas is commingled therewith in sufficient amounts. However, it is only necessary that it be kept below the flammable limit under the conditions existing in the light phase, either with respect to free oxygen content or with respect to combustible content, and a method for automatically controlling the quantity of diluent gas returned to the light phase in response and in direct relation either to the free oxygen content of the mixture in the light phase or its combustible content will now be described.

A representative sample stream of the gas mixture being discharged from the light phase of the regenerator is directed from line 10 through line 54 and valve 55 to a small combustion zone 56 of a gas analyzing instrument which is employed to determine either the free oxygen content or the combustible content of the sample. In case the process is to be operated with the gas mixture in the light phase of the regenerator containing a deficiency of oxygen to support a flame, the gas analyzer is operated to determine the free oxygen content of the sample gas stream and a constant relatively small amount of fuel is supplied to chamber 56 of the analyzer through line 57 and valve 58 to insure the presence of a sufficient quantity of combustibles in the sample supplied to combustion zone 56 to consume all the free oxygen of the sample. When the process is to be operated with a deficiency of combustibles in the gas mixture existing in the light phase of the regenerator, the analyzing instrument is operated to determine the combustible content of the sample stream withdrawn from line 10 and, to insure substantially complete burning of the combustibles in the stream a constant relatively small amount of air or other oxidizing gas is supplied to zone 56 through line 57 and valve 58 to completely oxidize the combustibles therein.

A coil of platinum or other material which acts as a catalyst for the combustion reaction is provided in zone 56 as indicated at 59. An electric current is supplied to this coil through portion 60 of the analyzer which also measures the resistance offered by coil 59 to the passage of electrical energy therethrough. When operated as an oxygen analyzer the resistance through coil 59 varies in direct relation to the oxygen content of the sample stream, since an increased amount of oxygen increases the rate of burning and the temperature in zone 56 and the resistance of platinum as well as most other metals varies in direct relation to temperature. For the same reason the resistance offered by coil 59 varies in direct relation to the combustible content of the sample stream when the gas analyzer is operating to determine its combustible content.

An impulse varying in magnitude with variations in the combustible content of the sample gas stream supplied to the analyzer or with variations in its oxygen content is transmitted from portion 60 of the analyzer to a suitable controller 61, which in the case illustrated is a control instrument of the air operated type. Air admitted to controller 61 through line 62 and valve 63 at substantially constant pressure increases the pressure in the air output line 64 from this instrument when the impulse supplied to controller 61 from the analyzer exceeds a predetermined value indicating that either the free oxygen content or the combustible content of the sample stream has increased. Conversely the pressure in the air output line from controller 61 decreases with a decrease in the oxygen content or combustible content of the sample stream. Line 64 from controller 61 is connected to the diaphragm of a reverse acting diaphragm type control valve 65 provided in the gas discharge line 42 from the blower or compressor 41. Thus with the gas analyzer operated for the determination of free oxygen in the sample stream, valve 65 will be opened or the opening therethrough will be increased when the oxygen concentration in the sample stream, as indicated by the analyzer, approaches the point at which the mixture existing in the light phase of the regenerator would be flammable. When the analyzer is operated for the determination of combustibles in the sample stream, any increase in its combustible content to a point approaching that at which the gas mixture in the light phase would be flammable will operate through the analyzer and controller 61 to open valve 65 or increase the opening therethrough and admit more diluent gas to the regenerator. The analyzing and control instruments are so adjusted that the quantity of diluent gas supplied to the regenerator is always sufficient to keep the gas mixture in the light phase non-flammable under the conditions prevailing therein.

Of course any other specific form of gas analyzer capable of indicating the presence of small amounts of free oxygen or small amounts of combustible components in the sample gas stream withdrawn from the regenerator may be employed within the scope of the invention. Also any other conventional form of control instrument may be substituted for the type indicated at 61 and, when desired, an hydraulic or electrically operated valve of any suitable well known form may be substituted for the diaphragm type air operated valve 65. It is of course also within the scope of the invention to withdraw the sample stream supplied to the gas analyzer directly from the light phase of the regenerator instead of from the gas discharge line 10 and, when required, suitable filters or the like may be provided for removing entrained solid particles from the sample gas stream before it is supplied to the analyzer. The invention also contemplates the use of any desired number of separators for removing entrained solid particles from the gas stream in the discharge line from the regenerator before it enters combustion chamber 29 and, when desired for substantially completing the recovery of solid particles from this gas stream, an electrical precipitator or the like not illustrated may be interposed in line 10.

It will be apparent from the above that the invention provides three alternative general methods of preventing after burning in the light phase of the regenerator. These alternative methods are not to be considered fully equivalents, although any one of them may be successfully employed in operations of the type to which the invention is addressed. Ordinarily we prefer to keep the free oxygen content of the gas mixture in the light phase low or to keep both its oxygen content and combustible content low.

The alternative provisions of the invention for supplying diluent gas either directly to the light phase of the regenerator, or through the fluid bed undergoing regeneration into the light phase above it, or in part directly and in part through the bed are also non-equivalent. The choice of these alternatives will depend to a large extent upon the quantity of diluent gas required, the size of the equipment and the approach desired to complete removal of combustibles from the contact material in the regenerating step. By passing all or a portion of the diluent gas through the fluid bed with the oxidizing gas and resulting combustion gases, the oxygen concentration of the entering regenerating gas stream is reduced as compared with an operation in which undiluted air, for example, is the only gas supplied to the lower portion of the regenerator. For a given total quantity of gas passed through the bed the recycle of diluent gas to the lower portion of the regenerator will reduce the burning rate, thereby reducing the heat involved per unit of time for the contact material in the regenerator, and will increase the quantity of heat carried from the bed in the outgoing gas stream. Both of these factors serve to reduce the temperature of regeneration and may be employed at least in part as a means of preventing this temperature from exceeding a safe level. On the other hand the rate of burning in the fluid bed at a given residence time for the solid particles in the regenerating zone determines the extent to which combustible contaminants are removed therefrom and hence their activity in the reaction step. Thus, for a given average activity, the residence time in the regenerator and the required size of this vessel is increased in inverse relation to the rate of burning in the fluid bed, the latter varying in direct relation to the regenerating temperature employed and the rate at which the free oxygen is supplied to the bed. Therefore, unless the regenerating vessel is of ample size to give the residence time required for obtaining the desired degree of regeneration, with dilution of the air or other oxidizing gas supplied through line 26, we prefer to return the diluted gas through line 43 to the upper portion of the generator.

Another important factor in determining how much diluent gas may be passed through the bed or whether all of the diluent gas required should be supplied directly to the light phase, is the permissible linear velocity of the gases passing upwardly through the bed. This velocity should not exceed that at which substantially hindered settling of the solid particles comprising the bed is obtained. At excessively high velocities the bed is thinned out (i. e., the density and solid particle concentration is reduced) and good heat distribution throughout the bed is not obtained.

We claim:

1. The method of removing combustible contaminants from a mass of substantially incombustible subdivided solids which comprises maintaining a bed of the solid particles in a confined zone, passing oxidizing gas upwardly through the bed at a velocity which keeps the bed in a fluid-like condition of relatively high solid particles concentration, burning combustibles from the bed by their contact with the oxidizing gas, maintaining a light phase region of materially reduced solid particle concentration above the bed in said zone, discharging gaseous products of the burning operation and entrained solid particles from said light phase, separating at least a major portion of the entrained solid particles from the outgoing gas stream, thereafter supplying the gases to a separate confined combustion zone, therein effecting the substantially complete removal of free oxygen and combustible components from the gases by combustion, and returning gases from said combustion zone to said light phase region in a quantity sufficient to reduce the combustible content of the gas mixture in said region to an amount not exceeding about 6 mol per cent and to reduce the free oxygen content of the gas mixture in said region to an amount not exceeding about 1.5 mol per cent.

2. The method of removing combustible contaminants from a mass of substantially incombustible subdivided solids which comprises maintaining a bed of the solid particles in a confined zone, passing oxidizing gas upwardly through the bed at a velocity which keeps the bed in a fluid-like condition of relatively high solid particle concentration, burning combustibles from the bed by their contact with the oxidizing gas, maintaining a light phase region of materially reduced solid particle concentration above the bed in said zone, discharging gaseous products of the burning operation and entrained solid particles from said light phase, separating at least a major portion of the entrained solid particles from the outgoing gas stream, thereafter supplying the gases to a separate confined combustion zone, therein consuming substantially all remaining free oxygen in the gases, and returning resulting gases substantially devoid of free oxygen to said light phase region in a quantity sufficient to reduce the free oxygen content of the gas mixture prevailing in the light phase region to an amount not exceeding about 1.5 mol per cent.

3. The method defined in claim 2 further characterized in that at least a portion of said gases returned to the light phase is supplied directly thereto without being passed through said bed.

4. The method defined in claim 2 further characterized in that at least a portion of said gases returned to the light phase is supplied thereto through said bed.

5. The method defined in claim 2 further characterized in that a portion of said gases returned to the light phase is supplied thereto through said bed while another portion thereof is supplied directly to the light phase without being passed through the bed.

6. The method defined in claim 2 wherein said gases being returned to the light phase are controllably cooled to a temperature below that prevailing in said combustion zone.

7. The method defined in claim 2 wherein the quantity of said gases returned to the light phase is controlled in response and in direct relation to the free oxygen content of the gases discharged therefrom.

8. The method of removing combustible contaminants from a mass of substantially incombustible subdivided solids which comprises maintaining a bed of the solid particles in a confined zone, passing oxidizing gas upwardly through the bed at a velocity which keeps the bed in a fluid-like condition of relatively high solid particle concentration, burning combustibles from the bed by their contact with the oxidizing gas, maintaining a light phase region of materially reduced solid particle concentration above the bed in said zone, discharging gaseous products of the burning operation and entrained solid particles from said light phase, separating at least a major portion of the entrained solid particles from the outgoing gas stream, thereafter supplying the gases to a separate confined combustion zone, therein substantially completing the burning of their combustible components, and returning gases from said combustion zone to said light phase region in a quantity sufficient to reduce the combustible content of the gas mixture prevailing in the light phase region to an amount not exceeding about 6 mol per cent.

9. The method defined in claim 8 further characterized in that at least a portion of said gases returned to the light phase is supplied directly thereto without being passed through said bed.

10. The method defined in claim 8 further characterized in that at least a portion of said gases returned to the light phase is supplied thereto through said bed.

11. The method defined in claim 8 further characterized in that a portion of said gases returned to the light phase is supplied thereto through said bed while another portion thereof is supplied directly to the light phase without being passed through the bed.

12. The method defined in claim 8 wherein said gases being returned to the light phase are controllably cooled to a temperature below that prevailing in said combustion zone.

13. The method defined in claim 8 wherein the quantity of said gases returned to the light phase in controlled in response and in direct relation to the combustible content of the gases discharged therefrom.

CHARLES L. THOMAS.
JOHN T. PINKSTON, Jr.